Dec. 10, 1968     L. HORNBOSTEL, JR     3,415,011
FLANGED PLANT CONTAINER
Filed March 11, 1966     2 Sheets-Sheet 1
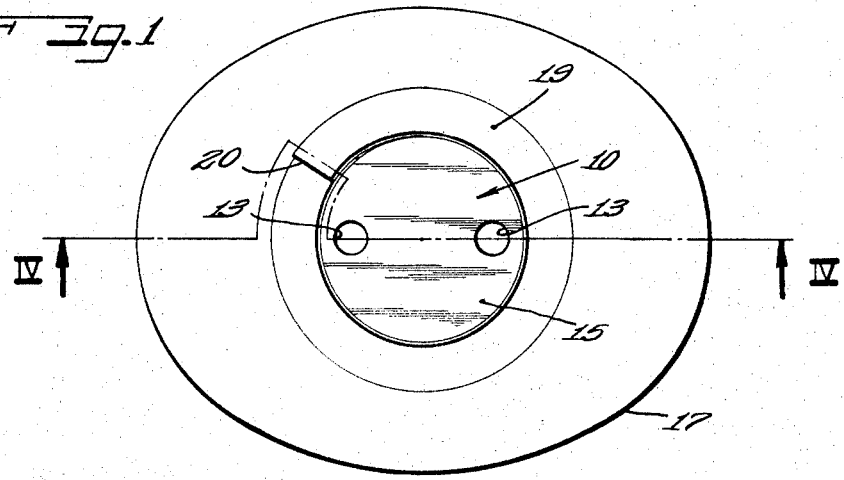
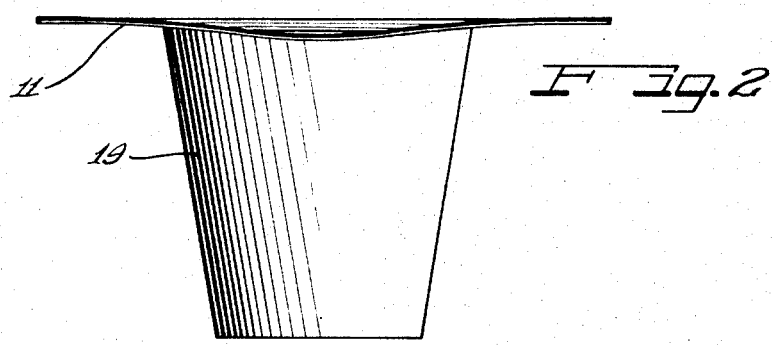
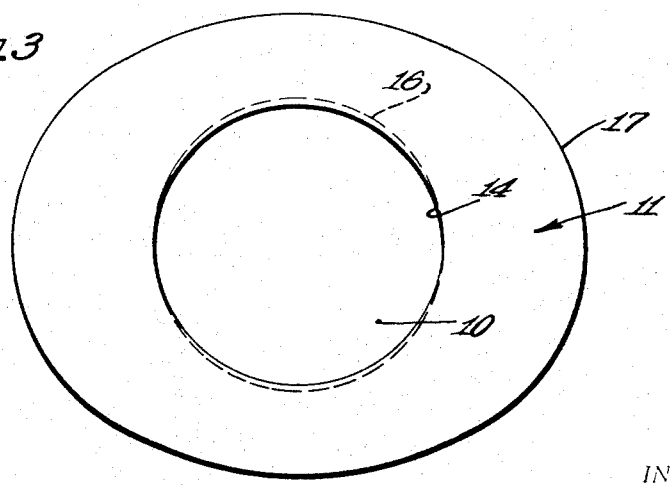
INVENTOR.
Lloyd Hornbostel, Jr.
BY *Hill, Sherman, Meroni, Gross & Simpson* ATTORNEYS Dec. 10, 1968    L. HORNBOSTEL, JR    3,415,011
FLANGED PLANT CONTAINER
Filed March 11, 1966    2 Sheets-Sheet 2
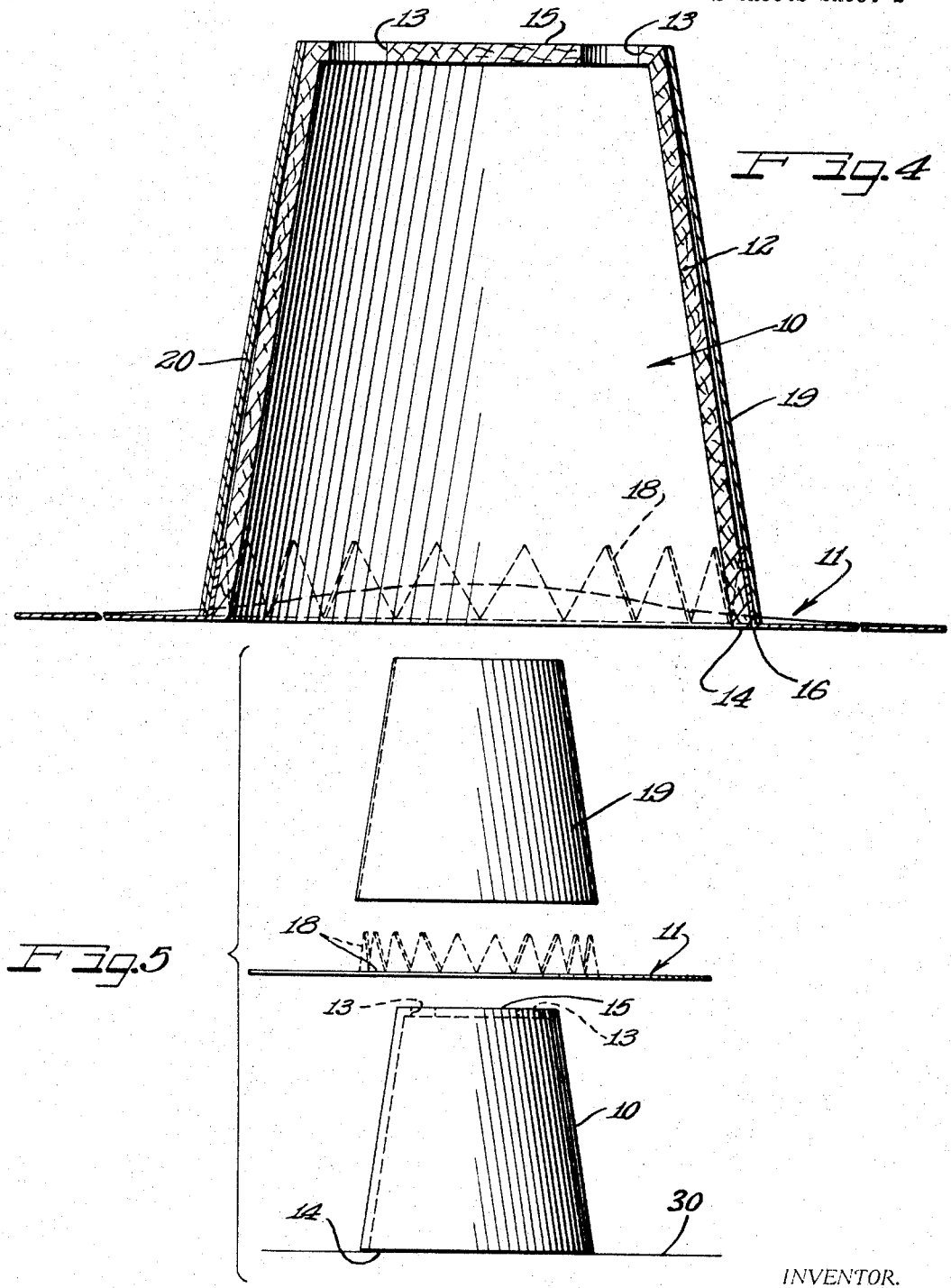
INVENTOR.
Lloyd Hornbostel, Jr.
BY  ATTORNEYS United States Patent Office 3,415,011
Patented Dec. 10, 1968

3,415,011
FLANGED PLANT CONTAINER
Lloyd Hornbostel, Jr., Beloit, Wis., assignor to Beloit Corporation, Beloit, Wis., a corporation of Wisconsin
Filed Mar. 11, 1966, Ser. No. 533,686
3 Claims. (Cl. 47—34)

ABSTRACT OF THE DISCLOSURE

A contoured brim is provided around the upper circular edge of a pot having the shape of frustum of an inverted cone by making a centrally located opening in the brim of an elliptical shape with the long axis equal to the outer diameter of the upper circular edge of the pot and the short axis of slightly lesser extent than said outer diameter. Assembly is effected by inverting the pot on a work surface, telescoping the brim, which has upstanding triangular teeth around the brim opening, over the smaller end of the pot until the brim wedges around the larger end with the teeth directed away from the upper edge of the pot, and then sliding a conical sleeve over the smaller end to clamp the teeth between the conical pot and the sleeve.

---

The present invention relates to improvements in containers and more particularly to an improved pot for plants or the like having an upper brim.

An object of the present invention is to provide an inexpensive improved mass-produced pot for plants or the like which can hold moist earth for plants without the wall absorbing the moisture and becoming weakened, which is light weight and strong, which can be made very attractive, and which has a laterally extending flanged brim at the upper edge.

A further object of the invention is to provide an improved pot for plants or the like which can be made of a resin impregnated waste pulp so as to be capable of being manufactured by inexpensive production methods, and yet which can be made extremely attractive with the body of the waste pulp container being covered and decorated in a unique manner.

A still further object of the invention is to provide a plant container which simulates the appearance of a hat and which has a head brim at its top with a curl or flair so that it has the appearance of a "Texan" type hat.

A still further object of the invention is to provide an improved tapered pot for plants or flowers with a brim at the top and an improved method of assembling the parts of the pot.

A feature of the invention is the provision of a tapered hollow container having a support base with a larger annular open top and an upper brim for the container extending laterally outwardly with a central annular opening and a projection extending downwardly around the opening along the surface of the walls of the container with the annular opening of the container being of a different shape than the annular open top of the container so that the brim will twist as the projection and wall of the container conform in shape, and being provided with an outer tapered sleeve which fits over the container and holds the projection and brim firmly to the container top.

Other objects, advantages and features will become more apparent with the teaching of the principles of the invention in connection with the disclosure of the preferred forms of the invention as shown in the drawings, in which:

FIGURE 1 is a bottom plan view of a pot embodying the principles of the present invention;

FIGURE 2 is an elevational view of the pot of FIGURE 1;

FIGURE 3 is a top plan view of the pot;

FIGURE 4 is an enlarged vertical sectional view taken substantially along line IV—IV of FIGURE 1; and FIGURE 5 is an exploded view of the elements of the pot illustrating the method of assembly in accordance with the principles of the present invention.

The pot assembly includes a central pot or container 10 formed of a molded pulp impregnated with a material to rigidify the pulp and make it relatively non-absorbent. Inexpensive pulp material such as paper waste is preferred, being mixed with a 10 to 20% resin or pitch size. The pot is formed by a structure and methods known to the art generally wherein a porous mold is partially immersed in a tank containing the pulp in a water suspension with the porous mold being subjected to an internal vacuum so that a layer of pulp deposits on the outer surface. The pulp then is further dewatered by being pressed, heated and dried and removed from the mold, preferably having a tapered shape as shown in the drawings.

The pot 10 will then have a conical wall 12 and a base 15 formed of the relatively rigid resin impregnated waste pulp and openings 13 may be formed at the bottom for drainage.

The upper edge 14 (the pot is shown in the inverted position which it conveniently takes for assemblage in FIGURES 4 and 5) is annular and in the preferred form is circular in shape.

The pot assembly is formed with a decorative and functional brim 11 at its top edge which may be formed of a pressed board printed or inked on its surface in colored decorations or carrying printing bearing a message. The brim 11 in combination with the pot 12 has the general appearance of a hat and an important feature of the invention is the structural relationship between the brim and the pot which gives the brim 11 a curl or a twist to give it the appearance of a Texan type hat. For improving the appearance of the outer surface of the pot 12 a functional and decorative sleeve 19 surrounds the wall of the pot 10.

The brim 11 has an annular opening 16 at its center substantially the same size as the outside of the upper edge 14 of the pot 10. This will permit wedging the brim tightly over the pot. The annular outer edge of the top edge 14 of the pot, and the opening 16 of the brim have a different annular shape so that as the brim is pushed tightly over the pot and the opening must conform to the shape of the substantially rigid pot, the brim will twist or flare to give it its unique Texan type flare.

In a preferred form the pot top edge 14 is made circular while the opening 16 in the brim is elliptical, although it will be appreciated that different annular shapes can be employed. Generally a circular pot is most useful and the most efficient to construct and with the wall of the pot being uniform in size the outer upper edge of the pot will have the same shape as the inner surface of the pot and therefore when reference is made herein to the shape of the top opening of the pot generally it is the shape of the outer top edge that is being referred to, which is of course the significant shape with respect to the opening in the brim and their functional interrelationship.

To further aid in the illusion of a Texas brim hat, the outer edge 17 of the hat may also be given a generally oval hat shape.

To aid in supporting the brim 11 in its position at the top of the pot, a projection is provided around the edge of the brim opening 16, which projection is preferably in the form of triangular shaped tabs 18 that lie along the outer surface of the pot 10. These tabs 18 are formed integrally with the brim which is originally in the form of a flat sheet of paper or board that is cut to the shape shown.

To further reinforce the structural relationship between the brim 11 and the pot 10, the outer sleeve 19 is constructed with its inner surface substantially the size of the outer surface of the pot 10 and is slid downwardly over the pot to telescope over the projections 18.

The unit is assembled in a unique manner, as shown in FIGURE 5, by resting pot 10 on a supporting table surface 30 and sliding the brim 11 downwardly over the tapered smaller bottom end 15 of the pot. The projections 18 will bend upwardly to the dotted line position of FIGURE 5 as they slide over the pot and the flange 11 will immediately assume its curled position as its opening 16 must assume the shape of the outer surface of the edge 14 of the pot 10. The sleeve 19 is then slid over the pot and will clear the projections 18 which lie closely along the outer surface of the pot wall but will pin them in their position. The parts will remain in this position without requiring the use of glue or other means for holding them because of the surface friction of the parts.

The outer sleeve is also formed of a decorative board or paper having a printed outer surface and can be originally a flat sheet cut and formed in a conical shape by rolling with the edges formed in a seam 20. FIGURE 1. This seamed construction allows easy accommodation of the brim contour, shown by the bowed dotted line in FIG. 4, by the upper edge of the outer sleeve 19. Otherwise, the upper edge of the outer sleeve may be cut to conform to the brim contour or if the sleeve material permits the upper edge may be merely compressed into conformity with the brim in the area of the contour.

The unique method of assembly of the parts offers advantages over other methods which would be obvious and which would include either moving the brim over the top larger end or forming the brim in parts and gluing it to the top end with subsequent wrapping of the sleeve over the parts and thereafter joining the ends of the wrapped sleeve. Or another obvious method might include sliding the projections 18 into the gap between the sleeve after the sleeve and pot have been assembled, but it will be seen that with the present method the parts are stressed only as they are assembled and their inherent resilience aids in holding them in place. Further, the method of assembly works rapidly and is well adapted to rapid piece work production type assemblage.

In summary, the structure includes a molded pulp rigid tapered pot 10 preferably having a circular top with a brim 11 fitting over the top and having an elliptical opening 16 to cause a curl in the brim. A sleeve 19 slides over the tapered pot holding the projections 18 in place with the brim 11 and sleeve 19 forming a decorative and protective cover for the pot.

The drawings and specification present a detailed disclosure of the preferred embodiments of the invention, and it is to be understood that the invention is not limited to the specific forms disclosed.

I claim:
1. A pot for plants or the like comprising in combination, a hollow container having a support base and a wall with an annular open top, and an upper brim for the container extending laterally outwardly having a central annular opening of a size to fit the open top of the container with said annular opening and said annular top being of different shapes so that the brim will twist as the annular open top of the container and the annular opening of the brim conform to each other, a projection around the opening extending downwardly along the outer surface of the wall of the container supporting the brim and conforming the brim opening to the opening of the container, and an annular outer sleeve substantially conforming at least to the outer portion of the container adjacent to the top and fitting over the outer surface of the container holding said projection to said outer surface.

2. A pot for plants or the like in accordance with claim 1, wherein said container is tapered with the open top being larger than the support base.

3. The method of manufacturing a hollow tapered hat-shaped container comprising:
  (A) forming a frusto-conical pot having a circular upper edge,
  (B) forming a brim from a piece of flat generally circular material, so that it has
    (1) a central elliptical opening therein with
    (2) an upstanding flange portion surrounding said opening,
  (C) forming a sleeve having an interior dimension equal to the outer dimension of the pot,
  (D) inverting said pot so that the upper edge lies on a support surface,
  (E) telescoping the brim over the pot until it wedges against the pot adjacent the upper edge and said flange portion extends away from the upper edge and in conformity with the outer edge of the pot,
  (F) telescoping the sleeve downwardly over the pot and over the upstanding flange portion so that the flange of the brim is securely clamped between the pot and the sleeve, and the brim is contoured to present a hat-like appearance.

References Cited

UNITED STATES PATENTS

| 2,651,044 | 9/1953 | Stakiewicz et al. | 2—171 |
| 2,848,842 | 8/1958 | Tennant | 47—34 |
| 3,153,301 | 10/1964 | Redyke | 47—34 |

ABRAHAM G. STONE, *Primary Examiner.*

S. C. PELLEGRINO, *Assistant Examiner.*

U.S. Cl. X.R.

2—171.1